April 28, 1953     G. P. HUMFELD     2,636,867

PLASTICS MOLDING COMPOSITIONS

Filed April 27, 1950

INVENTOR
GEORGE P. HUMFELD
BY
ATTORNEY

Patented Apr. 28, 1953

2,636,867

UNITED STATES PATENT OFFICE 2,636,867

PLASTICS MOLDING COMPOSITIONS

George P. Humfeld, Indianapolis, Ind., assignor to Radio Corporation of America, a corporation of Delaware Application April 27, 1950, Serial No. 158,385

8 Claims. (Cl. 260—23.7)

1

This invention relates to improved molding compositions especially adapted for the manufacture of disc sound records. More particularly, the invention relates to molding compositions in which the essential ingredients are polystyrene and another synthetic resin which is a copolymer of styrene and butadiene.

Of the many synthetic resins which have been discovered, very few have been found to have properties meeting the exacting requirements of the phonograph record industry. Record compositions must, first of all, have excellent molding qualities. They must be able to be molded using a very short molding cycle. They must also be highly plastic and able to fill out the mold completely leaving no minute unfilled spots since these detract from the sound reproducing qualities of the finished product. Low molding temperatures are also desirable for economical production.

Secondly, the finished records made from the compositions must have many properties such as good wearing qualities, quiet sound groove, good flexural strength, and high resistance to warping.

Heretofore, highest quality sound records of the non-breakable type have been made of unfilled vinyl resin compositions. These resins are relatively expensive and are also rather difficult to mold.

Phonograph records made out of the compositions of the present invention have good wear properties, high flexural strength, and good molding properties compared to compositions which consist essentially of vinyl resins. However, the resins used in the present compositions are somewhat more economical.

One object of the present invention is to provide novel molding compositions containing synthetic resinous materials.

Another object of the invention is to provide novel molding compositions particularly adapted for making phonograph records.

Another object of the invention is to provide improved plastics molding compositions able to tolerate large proportions of fillers.

Another object of the invention is to provide improved semi-non-breakable records of good quality and low cost.

These and other objects will be more apparent and the invention will be more readily understood from the following description including the drawing. The single figure of the drawing is a cross section view of one embodiment of a sound record which can be made from the compositions of this invention.

Essentially, the compositions of this invention comprise about 27% by weight of a pair of primary resinous ingredients consisting of (1) polystyrene and (2) a copolymer of styrene and butadiene. Each of the members of this pair of primary ingredients may be varied within a range of about 7% to about 20% by weight of the total composition. The sum of these two ingredients must not exceed about 27% of the total composition, however. The copolymer of styrene and butadiene may be varied such that its composition may range from about 65% copolymerized styrene and 35% butadiene to about 85% copolymerized styrene and 15% butadiene. Other essential ingredients of the compositions are a metallic soap such as lead stearate, a wax, and from about 61 to 71% finely divided filler.

In addition to the two primary resinous ingredients mentioned above, other secondary resins may be added to vary the properties somewhat. For example, there may be added any amount up to about 10% by weight and preferably between 2 and 10% by weight of low melting point diluent resins such as Vinsol and Chlorowax. Vinsol is the gasoline insoluble, aromatic hydrocarbon soluble, resinous extract of pine wood. Chlorowax is a chlorinated saturated straight chain hydrocarbon. The particular chlorinated hydrocarbon which is preferred for use is one which is 70% chlorinated and has a melting point of 90° C.

The diluent resins which are used in this part of the composition may be present in any relative proportion within the total percentage specified. They aid in wetting and dispersing the filler materials which make up the bulk of the compositions. The secondary resinous ingredients may be further varied by making substitutions for the Vinsol or Chlorowax content. For example, there may be substituted the resins which are chlorinated biphenyls or chlorinated polyphenyls having a softening point preferably between about 100 and 105.5° C. These resins may be substituted in any proportion up to 10% of the total composition weight.

There may also be used various coloring agents including carbon black. The carbon black may be present in fairly large amounts and should be regarded as part of the filler in these compositions.

In the following table are given some preferred compositions which may be used to make phonograph records of excellent quality. All figures in this table are in percentages by weight.

|  | A | B | C | D |
|---|---|---|---|---|
| Polystyrene (Molecular Weight 100,000 to 200,000) | 7 | 20 | 20 | 20 |
| 85% Styrene-15% butadiene copolymer | 20 | 7 | 7 | 7 |
| Chlorowax (70% chlorinated, melting point 90° C.) | 6 | 6 |  | 6 |
| Vinsol | 4 | 4 |  | 4 |
| Lead Stearate | 1 | 1 | 1 | 1 |
| Carnauba Wax | 1 | 1 |  |  |
| Microcrystalline Petroleum Wax (melting point 195°-200° F.) |  |  | 1 | 1 |
| Carbon Black | 2 | 2 | 2 | 2 |
| Ground Limestone Filler (325 mesh) | 29 | 29 | 34 | 59 |
| Ground Slate Filler (325 mesh) | 30 | 30 | 35 |  |

In these formulations, other metallic stearates may, of course, be substituted for lead stearate. For example, zinc stearate or aluminum stearate can be used. The particular stearate used is not critical. Likewise, other waxes may be used in place of those mentioned above. Any wax which is compatible with the essential resinous ingredients may be used. Examples of other suitable waxes are cetyl acetamide and candelilla. The preferred range of metal stearate is about 1 to 3% by weight. The preferred amount of wax is from about ½ to 2% by weight. The presence of the metal soaps results in less sticking of the compositions to metal surfaces during processing. Waxes improve plasticity during processing and increase the wear resistance of the record's playing surface to the playing stylus.

The fillers mentioned above are also merely examples of many mineral fillers which may be used. Various clays, diatomaceous earth, or organic fillers, like wood flour, walnut shell flour, etc., may be used. It is also possible to use higher percentages of carbon black in the total filler content. Up to about ⅓ of the total filler may be carbon black if desired.

Phonograph records may be made out of these compositions by the following process. All of the ingredients are mixed together, preferably in a banbury mixer, at a temperature of about 350 to 400° F. for 3 to 5 minutes. After mixing, the compositions are then sheeted on rolls to form a sheet of uniform thickness. In order to mold phonograph records out of the sheeted material, "biscuits," that is, rectangular shaped blocks, of the material are then preheated to a temperature of about 375 to 400° F., placed in a conventional compression molding press and molded at a temperature of about 330 to 340° F. The sound record molded from the compositions may be of any conventional type such as that illustrated in the figure. The single figure shows a cross section view of a typical disc phonograph record 2 having a spindle hole 4, playing area portion 6 and label area portion 8.

The phonograph records made of these compositions may be classed as semi-non-breakable. That is, they will not break in ordinary handling and must be bent to a considerable angle before they will shatter.

I claim as my invention:

1. A molding composition comprising about 27% by weight of a pair of primary resinous ingredients consisting of polystyrene and a copolymer of styrene and butadiene in which the amount of each of said ingredients varies from about 7% to about 20% by weight of the total composition, said copolymer containing about 65% to about 85% by weight copolymerized styrene, said composition further comprising 2% to about 10% by weight of secondary resinous ingredients from the class consisting of 70% chlorinated saturated straight chain hydrocarbons, the gasoline insoluble, aromatic hydrocarbon soluble resinous extract of pine wood, and chlorinated biphenyls, from about ½ to 2% by weight wax, about 1 to 3% by weight metallic soap, and about 61 to 71% by weight filler.

2. A composition according to claim 1 containing 7% polystyrene, 20% copolymer, 1% wax, 1% of said metallic soap in the form of a stearate, 10% of said secondary resinous ingredients, and 61% filler.

3. A composition according to claim 2 in which said filler includes 2% carbon black.

4. A composition according to claim 1 in which up to ⅓ of said filler is carbon black.

5. A composition according to claim 1 containing 20% polystyrene, 7% copolymer, 1% wax, 1% of said metallic soap in the form of a stearate, 10% of said secondary resinous ingredients, and 61% filler.

6. A composition according to claim 4 in which said secondary resinous ingredients consist essentially of 6% of a 70% chlorinated saturated straight chain hydrocarbon and 4% of the gasoline insoluble, aromatic hydrocarbon soluble, resinous extract of pine wood.

7. A sound record made of a composition comprising about 27% by weight of a pair of primary resinous ingredients consisting of polystyrene and a copolymer of styrene and butadiene, said copolymer containing about 65% to about 85% by weight copolymerized styrene, said composition further comprising 2% to about 10% by weight of secondary resinous ingredients from the class consisting of 70% chlorinated saturated straight chain hydrocarbons, the gasoline insoluble, aromatic hydrocarbon soluble resinous extract of pine wood, and chlorinated biphenyls, about ½ to 2% by weight wax, about 1 to 3% by weight metallic soap and about 61 to 71% by weight filler.

8. A sound record according to claim 7 in which each of said primary resinous ingredients varies from 7 to 20% by weight of the total composition.

GEORGE P. HUMFELD.

References Cited in the file of this patent

UNITED STATES PATENTS

| Number | Name | Date |
|---|---|---|
| 1,997,489 | Hermann et al. | Apr. 9, 1935 |
| 2,028,126 | Warren | Jan. 14, 1936 |
| 2,269,267 | Hunter | Jan. 6, 1942 |
| 2,388,685 | Guss et al. | Nov. 13, 1945 |
| 2,515,801 | Sadowski | July 18, 1950 |
| 2,574,439 | Seymour | Nov. 6, 1951 |

OTHER REFERENCES

Winkelmann, India Rubber World, March 1946, pp. 799–804.

Dow Latex 512, published by Dow Chem. Co., October 1946, pp. 3 and 12.

Diamond Chlorowax, pages 4 to 7, published 1945 by Diamond Alkali Co., Pittsburgh, Pa.